(12) United States Patent
Sun et al.

(10) Patent No.: US 12,278,719 B2
(45) Date of Patent: Apr. 15, 2025

(54) RECEIVER WITH FEED FORWARD EQUALIZATION

(71) Applicant: Apple Inc., Cupertino, CA (US)

(72) Inventors: Bo Sun, Carlsbad, CA (US); Jafar Savoj, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/931,096

(22) Filed: Sep. 9, 2022

(65) Prior Publication Data
US 2024/0089154 A1    Mar. 14, 2024

(51) Int. Cl.
H04L 25/03 (2006.01)
H04L 7/00 (2006.01)

(52) U.S. Cl.
CPC ...... H04L 25/03038 (2013.01); H04L 7/0016 (2013.01)

(58) Field of Classification Search
CPC .......... H04L 25/03038; H04L 7/0016
USPC .......................................... 375/232
See application file for complete search history.

(56) References Cited

U.S. PATENT DOCUMENTS

| | | | |
|---|---|---|---|
| 7,167,516 B1* | 1/2007 | He | H04L 7/0334 375/232 |
| 10,425,257 B1* | 9/2019 | Shakiba | H04L 25/03267 |
| 10,727,895 B1* | 7/2020 | Nguyen | H04B 1/44 |
| 2004/0136731 A1* | 7/2004 | Wang | H04B 10/6971 398/208 |
| 2006/0088090 A1* | 4/2006 | Azenkot | H04L 25/03057 375/233 |
| 2013/0114665 A1* | 5/2013 | Aziz | H03F 3/45183 330/69 |
| 2014/0003824 A1* | 1/2014 | Sun | H04B 10/532 398/202 |
| 2014/0064352 A1* | 3/2014 | Zhong | H04L 25/03076 375/232 |
| 2014/0294059 A1* | 10/2014 | Yamagata | H04L 25/03159 375/233 |
| 2020/0084074 A1 | 5/2020 | Toprak-Deniz et al. | |
| 2020/0373897 A1* | 11/2020 | Wang | H03H 7/18 |
| 2022/0103400 A1* | 3/2022 | ElShater | H04L 25/03878 |
| 2022/0158877 A1 | 5/2022 | Kang et al. | |
| 2022/0302951 A1* | 9/2022 | Pandita | H04L 25/03019 |

* cited by examiner

*Primary Examiner* — Kevin M Burd
(74) *Attorney, Agent, or Firm* — Kowert, Hood, Munyon, Rankin & Goetzel, P.C.; Dean M. Munyon

(57) ABSTRACT

A receiver with feed-forward equalization is disclosed. A receiver includes a delay circuit configured to receive a first signal that encodes a serial data stream having a plurality of data symbols. The delay circuit includes at least one T-coil circuit and is configured to generate a plurality of delayed signals using the first signal. The receiver further includes a front-end circuit configured to generate an equalized signal using the at first signal and one or more delayed signals of the plurality of delayed signals. A sample circuit is configured to sample the equalized signal to generate a plurality of samples. A recovery circuit configured to generate a plurality of recovered data symbols using the plurality of samples.

20 Claims, 9 Drawing Sheets

RECEIVER WITH FEED FORWARD EQUALIZATION

BACKGROUND

Technical Field

This disclosure is directed to electronic circuits, and more particularly, to circuits used in high-speed serial links.

Description of the Related Art

High-speed links utilizing serializers-deserializers (SERDES) are commonly used in modern communications systems. These types of systems use various encoding schemes, some of which embed a clock signal in a serial-data stream that is conveyed from a transmitter to a receiver. On the receiver side of the communications, a clock and data recovery (CDR) circuit recovers the clock signal and the data, using the former to synchronize the latter.

In addition to a CDR circuit, high-speed serial links may also include a circuit known as a continuous time linear equalizer (CTLE). A CTLE may include various circuits that perform equalization of an incoming signal. This may condition the signal to allow the recovery of symbols by the CDR circuit.

SUMMARY

A receiver with feed-forward equalization is disclosed. In one embodiment, a receiver includes a delay circuit configured to receive a first signal that encodes a serial data stream having a plurality of data symbols. The delay circuit includes at least one T-coil circuit and is configured to generate a plurality of delayed signals using the first signal. The receiver further includes a front-end circuit configured to generate an equalized signal using the at first signal and one or more delayed signals of the plurality of delayed signals. A sample circuit is configured to sample the equalized signal to generate a plurality of samples. A recovery circuit configured to generate a plurality of recovered data symbols using the plurality of samples.

In one embodiment, the delay circuit includes a plurality of T-coil circuits coupled in series, with the delay circuit having a plurality of taps. The front-end circuit comprises a continuous time linear equalizer (CTLE) having a number of inputs coupled to the various taps. A first tap is coupled to an input of the first T-coil circuit and thus provides a direct signal input (e.g., without delay) to the CTLE, while ones of the remaining taps provide versions of the incoming signal as inputs to the CTLE at different amount of delay. The arrangement of the delay circuit relative to the CTLE may allow cancellation of a pre-cursor in the incoming signal, and may further allow cancellation of a post cursor.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to a receiver with feed-forward equalization. Signals transmitted on high-speed serial links typically have many artifacts that can affect a clock and data recovery (CDR) circuit in recovering symbols embedded therein. On the receiving end of such links, filtering may be performed by, e.g., T-coil circuits, to delay and filter out some of these artifacts prior to the signal being forwarded to a continuous time linear equalizer (CTLE) and subsequently, to a CDR circuit. However, artifacts from a pre-cursor and/or a post-cursor may still be present, and are typically unaccounted for in the receiver circuits of high-speed serial links.

The present disclosure utilized the insight that, if a received signal could be captured at the input, without delay, the precursor and/or the post cursor elements could be determined and thus canceled out. Accordingly, the present disclosure is directed to the use of a feed-forward circuit in serial receiver link. The serial receiver link includes one or more delay circuits (e.g., T-coils), and may also include corresponding ESD circuits. The delay circuits form taps that are fed to a CTLE. A feed forward circuit is coupled directly to the input/pad, and received and routes the incoming signal either directly to the CTLE or via ESD circuits, without any substantial delay. Using the signal as received by the feed forward circuit, cancellation signals are generated that cancel precursor and/or artifacts from the signal prior to it being forwarded to a sampler and a symbol recovery circuit. The cancellation of these artifacts may allow for better performance in downstream circuitry used to recover the symbols, including any decision feedback equalization (DFE) circuitry.

The present disclosure begins with a discussion of various embodiments of a receiver circuit having feed-forward equalization. A brief discussion of an IC implementation of inductor coils used for T-coils in one embodiment of a receiver circuit is then described, followed by discussion of a communications system having a serial link. Thereafter, the discussion continues with regard to embodiments of a method for operating a receiver circuit. The disclosure concludes with a discussion of an example system in which embodiments of the receiver may be implemented.

Receiver Embodiments With Feed Forward Equalization

Figure 1:
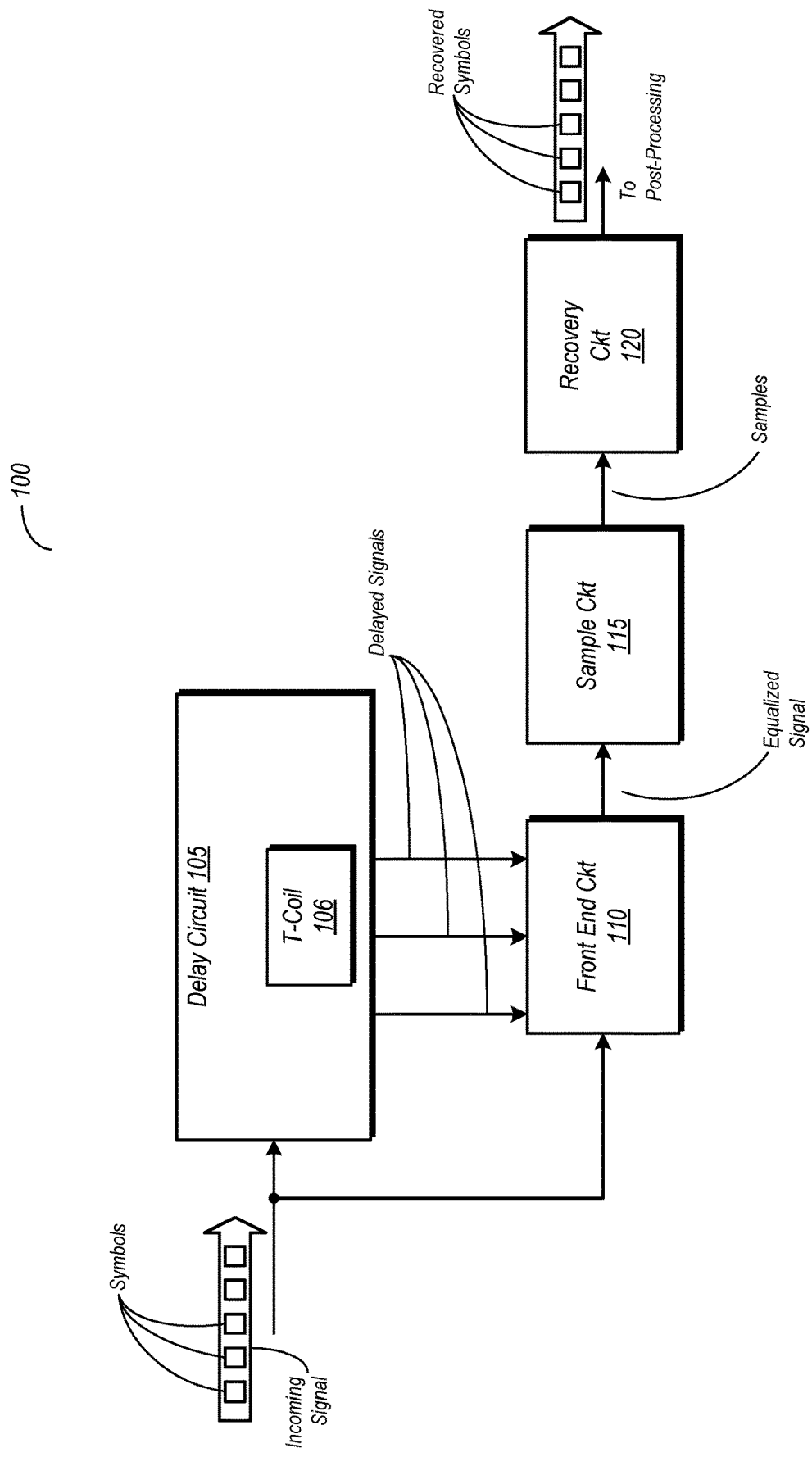
FIG. 1 is a block diagram of one embodiment of a receiver circuit.

Turning now to FIG. 1, a block diagram of one embodiment of a receiver in a communications system is shown. Receiver 100 in the embodiment shown is coupled to receive an incoming signal from a serial link. The incoming signal is a signal that encodes a serial data stream and thus includes symbols embedded therein. An embedded clock signal may also be included in the incoming signal as well. The symbols may be encoded according to a particular communications protocol, such as PAM3, PAM4, NRZ, and so on.

The incoming signal may be received be a delay circuit 105, and may also be received directly by front end circuit 110. Delay circuit 105 in the embodiment shown includes at least one T-coil circuit 106, and is configured to output a plurality of delayed signals. In embodiments having more than one T-coil circuit 106, the circuits may be serially-coupled, as will be discussed in further detail below. The delayed signals may be taken from taps in the one or more T-coil circuits 106. A tap can be placed at a junction of two different coils in a given T-coil circuit 106, and may also (or alternatively) taken from the output of a T-coil circuit 106.

The front-end circuit 110 in the embodiment shown is coupled to receive the incoming signal directly, as well as the various delayed signals generated by delay circuit 105. In one embodiment, front-end circuit 110 is a CTLE circuit, although embodiments using other types of front-end circuits are possible and contemplated. Using the incoming signal and the one or more delayed signals received from delay circuit 105, front-end circuit generates an equalized signal. Based on receiving an un-delayed version of the incoming signal, the equalization carried out by front-end circuit 110 may eliminate or substantially reduce a pre-cursor, a post-cursor, or both.

The equalized signal generated by front-end circuit 110 is provided to a sample circuit 115. Sample circuit 115 may include appropriate sampling circuitry, including slicers and/or other type of circuitry used to distinguish between voltage levels corresponding to different symbols within the equalized signal. Sample circuit 115 may also include circuitry that is synchronized to a clock signal to allow samples to be taken at a desired frequency in some embodiments, including in which the incoming signal does not have a clock signal embedded therein.

The samples output from sample circuit 115 are provided to a recovery circuit 120 in the embodiment shown, which recovers the symbols that were originally sent on a transmitter side of the communications link (not shown). Recovery of symbols may include carrying out decoding operations. For example, the symbols in the incoming signal may be encoded, on the transmit side of the link, using 8b/10b encoding, and thus recovery circuit may include corresponding decoders to recover the original data. Recovery circuit 120 may be implemented as a CDR circuit in some embodiments and may thus recover a clock signal embedded within the symbols of the incoming signal. The symbols output from recovery circuit 120 may be output to other circuits downstream for post-processing by functional circuits within the same IC as receiver 100.

Although not shown here, some embodiments may implement decision feedback equalization (DFE) to provide further equalization prior to recovery of the symbols from the equalized signal. Accordingly, the symbols recovered by recovery circuit 120, in addition to being conveyed to other functional circuits in the IC of receiver circuit 100, may also be fed back to sample circuit 115 which may, for example, adjust sampling voltage levels in slicing circuits implemented therein.

Figure 2:
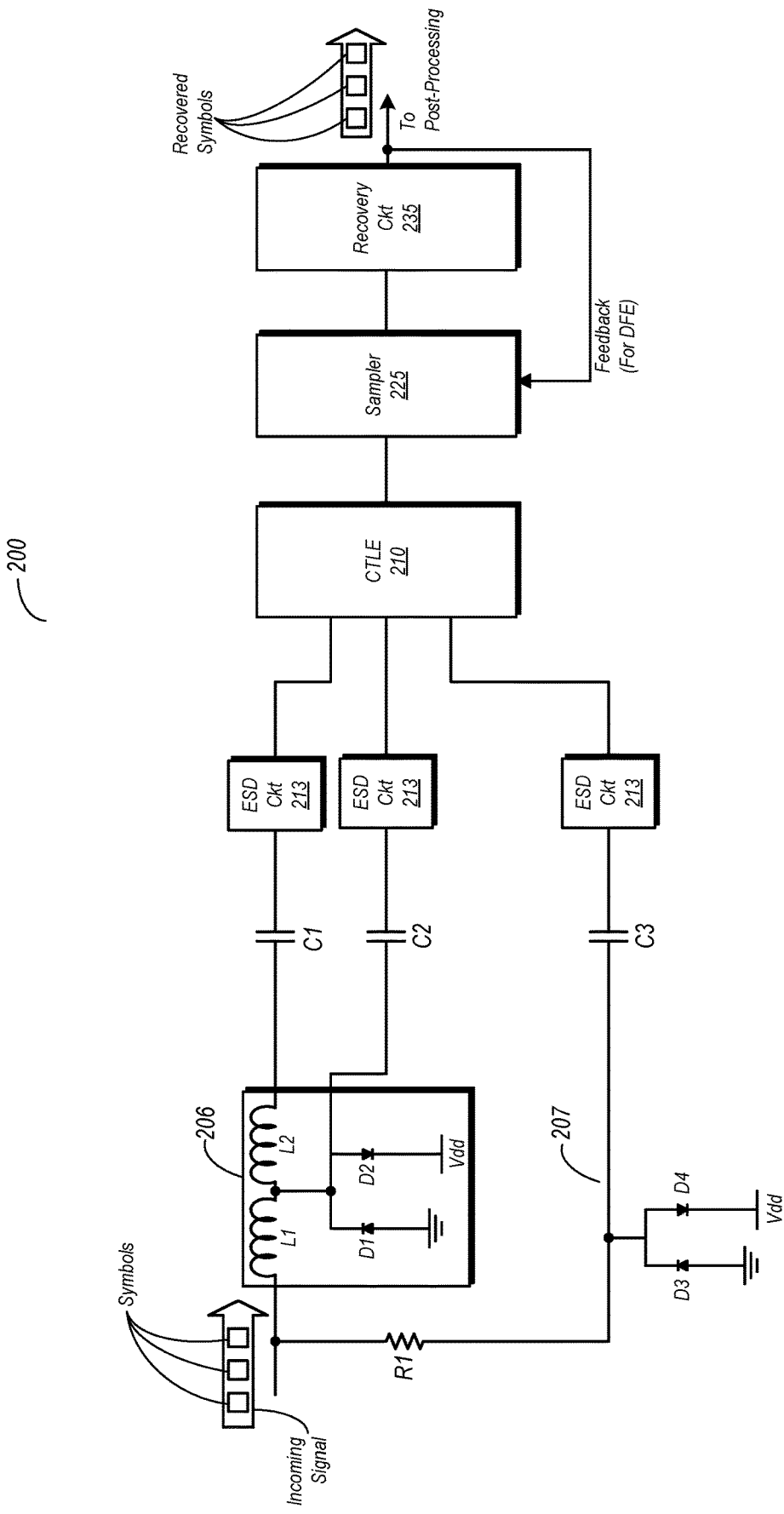
FIG. 2 is a schematic diagram of another embodiment of a receiver circuit.

FIG. 2 is a diagram illustrating another embodiment of a receiver. In the embodiment shown, receiver 200 includes a delay circuit implemented using a single T-coil 206. The T-coil circuit 206 includes a pair of inductor coils L1 and L2, with a center tap located at a junction there between. A pair of diodes D1 and D2 are also shown, although in some embodiments, these diodes may be intrinsic rather than actual components (this also holds true for diodes D3 and D4 shown in the drawing). T-coil circuit 206 in this embodiment is configured to output two different delayed signals, one from the center-tap junction of L1 and L2 (to capacitor C2) and the another from the other junction of L2 (to capacitor C1).

Receiver 200 in the embodiment shown also includes a feed-forward path 207 that is used to convey the incoming signal to CTLE 210 without substantial delay. The feed-forward path 207 includes a resistor R1 and a capacitor C3, which provides for AC coupling to the other end of the path. The paths for the delay signals output from T-coil 206 are also AC-coupled, via C1 and C2. It is noted that the AC-couple paths shown here are not intended to be limiting, and embodiments having DC-coupled paths are also possible and contemplated.

In this particular embodiment, the feed-forward path 207 as well as the paths coupled to convey delayed signals from T-coil circuit 206 includes ESD (electro-static discharge) circuits 213. These circuits may be include in embodiments in which, e.g., receiver 200 is implemented at the boundary of an IC and thus the incoming signal is received from an external source. The ESD circuits 213 may be implemented as charged device model (CDM) type ESD circuits, although embodiments implemented as human body model (HBM) ESD circuits are also possible and contemplated, as are ESD circuits that implement both of these types.

The delayed signals output from T-coil circuit 206 as well as the incoming signals conveyed via feed-forward path 207 are input into CTLE 210, which carries out various functions, including equalization and filtering. The equalization may include adjusting the respective amplitudes of the incoming signal and the delayed signals, as well as combining them post amplitude adjustment. The signals may then be filtered, and in some instances, further amplitude adjustment may take place.

The equalized and filtered output signal from CTLE 210 is then forwarded to sampler 225. Sampler 225 may perform sampling to determine the respective values of the various symbols from the signal received from CTLE 210. The resulting samples output by sampler 225 may be the encoded values of the symbols that may be subsequently decoded in recovery circuit 235 to recover the original data (pre-encoding on the transmitter end of the link). In this particular embodiment, the recovered symbols may also be fed back to from recovery circuit 235 to sampler 225 via a DFE feedback loop. Accordingly, sampler 225 may perform additional equalization on the signals received thereby, using the history of previous samples in determining the value of current samples.

Providing the incoming signal without any substantial delay to CTLE 210 in the illustrated embodiment may allow for elimination of artifacts in the subsequently equalized signals, including a pre-cursor. This in turn may reduce the errors in the data encoded in the incoming signals.

Figure 3:
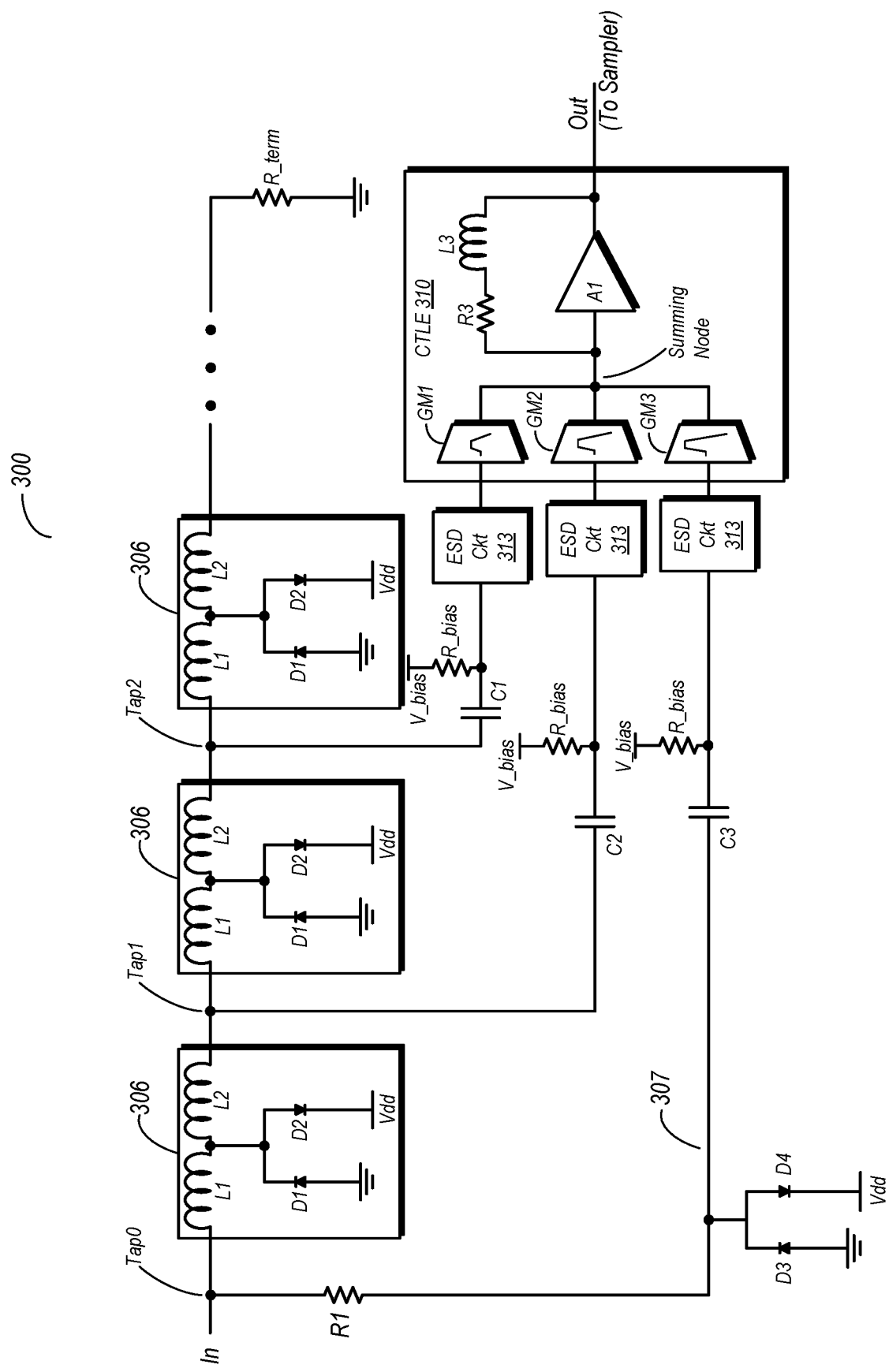
FIG. 3 is a schematic diagram of another embodiment of a receiver circuit.

FIG. 3 is a schematic diagram of another embodiment of a receiver circuit. In the embodiment shown, receiver 300 includes a delay circuit having a plurality of serially-coupled delay elements, implemented here at T-coil circuits 306. As with the previous embodiment, the incoming signal may be forwarded to a CTLE 310 without substantial delay via feed-forward path 307, which is coupled to Tap0. Additional taps (e.g., Tap1, Tap2) are coupled to respective outputs of ones of the T-coil circuits 306. Although only three taps are shown in this particular example, the actual number of taps may be any number desired for a given embodiments. The delay signal path through the T-coils 306 in the embodiments shown is terminated by a termination resistor, R_term, that is coupled to a ground node.

Each of the signal paths providing an input signal into CTLE 310 (e.g., feed-forward path 307 and the two delay signal paths from Tap1 and Tap2) are AC coupled to a corresponding ESD circuit 313 in the illustrated embodiment. Additionally, each of these signal paths may be DC-biased via a bias voltage, V_bias, and a bias resistor, R_bias, between their respective capacitors and ESD circuits. The signals may be input into various ones of a number of transconductance circuits in CTLE 310. Each of these transconductance circuits, GM1, GM2, and GM3 in this embodiment, may adjust the amplitude of their respectively received signal. The respective amplitude adjustments may vary from one transconductance circuit to the next. These various transconductance circuits may be implemented with in any suitable configuration. For example, in one embodiment, the transconductance amplifiers may be common-source amplifiers implemented with a single transistor, with each of the amplifiers having their own unique gain. Other more complex implementations of the transconductance circuits are also possible and contemplated.

The outputs of the various transconductance circuits are coupled to one another at a summing node. Accordingly, each of the amplitude adjusted output signals are combined on the summing node to generate a combined signal. This signal may undergo further amplitude adjustment by amplifier A1 as well as filtering using resistor R3 and inductor L3, with the output from CTLE 310 provided as an equalized signal. Although not explicitly shown here, receiver 300 may also include a sampler circuit and a recovery circuit arranged in a manner similar to those discussed above in reference to FIGS. 1 and 2.

In this particular embodiment, using the un-delayed signal provided via feed-forward path 307 along with multiple delayed signals from the outputs of the various T-coil circuits 306 may allow for cancellation of both the precursor and the post-cursor from the signal that was originally received. This may further enhance the integrity of the signal prior to sampling and symbol recovery downstream.

Figure 4:
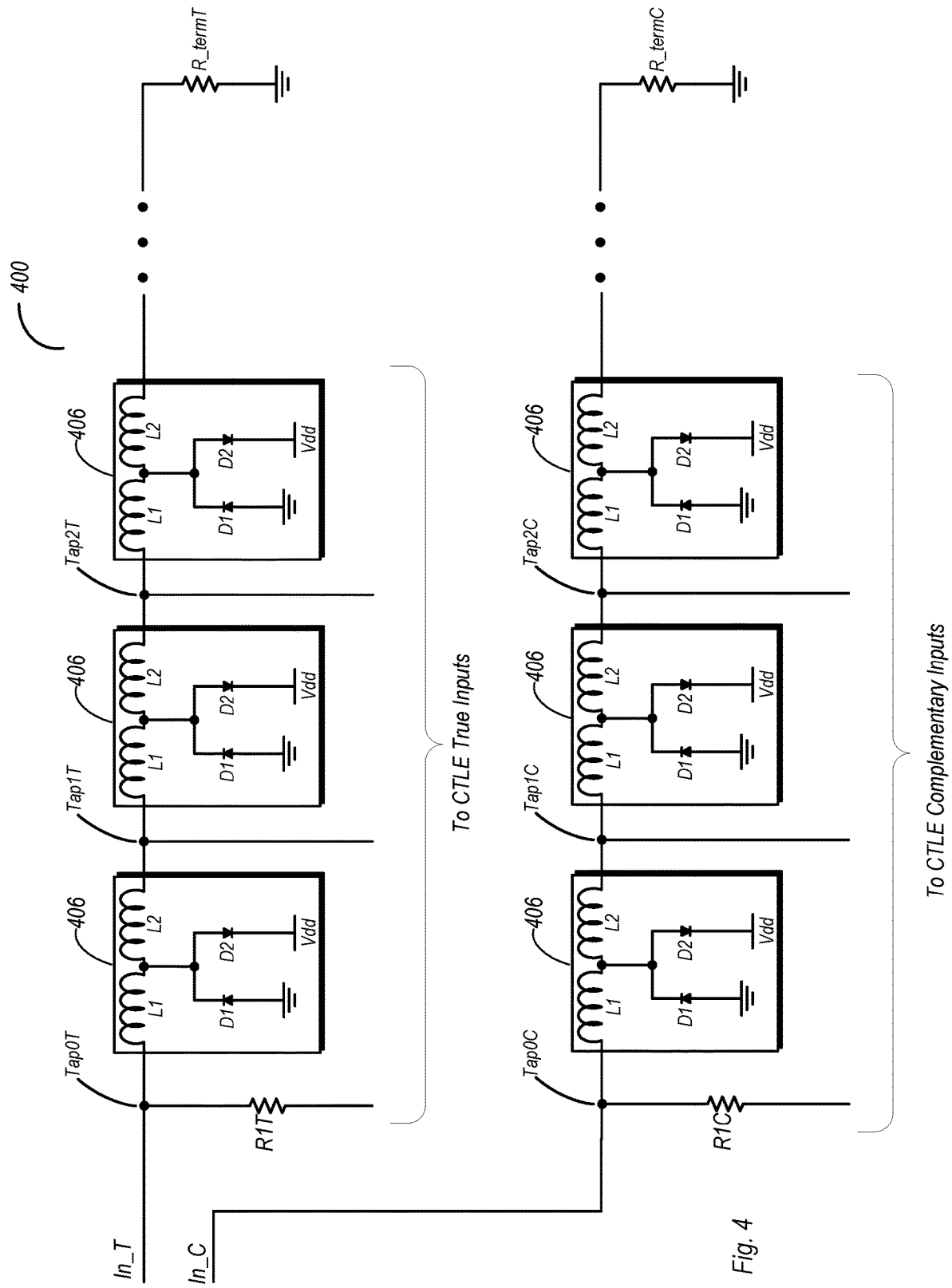
FIG. 4 a schematic illustrating a portion of a receiver circuit configured for receiving differential signals.

FIG. 4 a schematic illustrating a portion of a receiver circuit configured for receiving differential signals. Although the embodiments discussed above are illustrated as using single-ended signaling, in practice, many high-speed serial links utilize differential signaling. FIG. 4 illustrates the arrangement of delay circuitry in one embodiment of a receiver 400. Although the additional circuit units are not illustrated herein (e.g., the CTLE and components thereof, the sampler, etc.) it is to be understood that such circuits can be duplicated in the same manner as the delay circuits shown here in order to implement the receiver using differential signaling.

In this embodiment, a first delay circuit is coupled to the true signal path, In_T, while a second delay circuit is coupled to the complementary signal path, In_C. Each of the delay circuit shown here is implemented using a chain of serially-coupled T-coil circuits, while each of which is also terminated by a corresponding termination resistors. A first plurality of taps, Tap0T, Tap1T, Tap2T, etc., are coupled to true inputs of a CTLE. A second plurality of taps, Tap0C, Tap1C, Tap2C, etc., are coupled to complementary inputs of a CTLE. Accordingly, each of the delay circuits provides an un-delayed signal, via a corresponding feed-forward path, as well as a number of delayed signals, to corresponding inputs of the CTLE. Signals from both the true and complementary delay circuits may undergo amplitude adjustment, combining, filtering, and equalization as discussed above using suitable circuitry. Embodiments of a receiver configured to receive differential signals may also have differential-to-single-ended conversion circuits as well.

Concentric Coils for t-Coil Circuit

Figure 5:
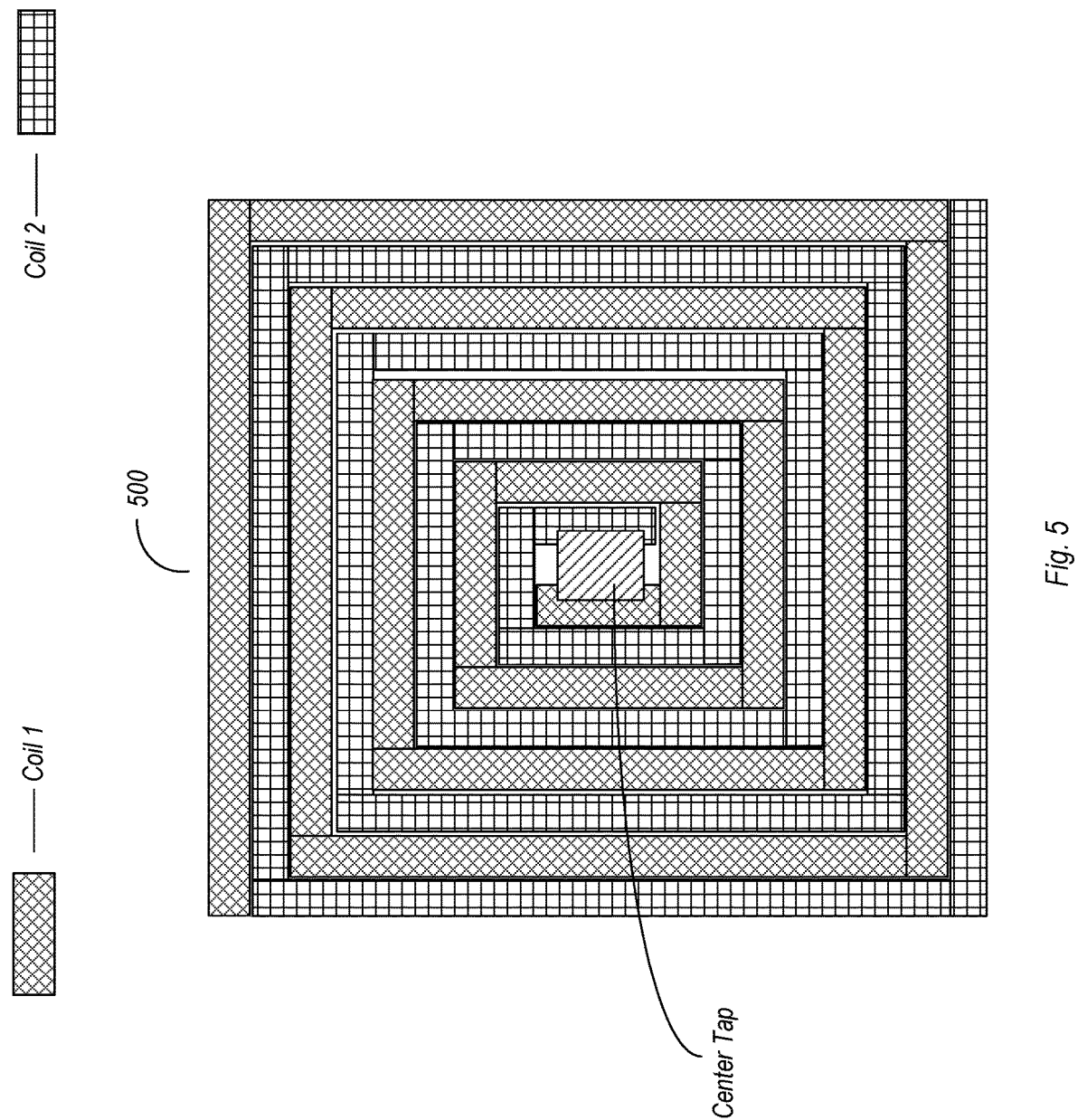
FIG. 5 is a drawing illustrating one embodiment of coupled coils implemented on an IC as part of a T-coil circuit.

FIG. 5 is a drawing illustrating one embodiment of coupled coils implemented on an IC as part of a T-coil circuit. In the embodiment shown, coupled coil 500 includes Coil 1 and Coil 2, as distinguished by the cross-hatching. The two coils have the same number of winds, and may both originate on the same metal layer of the IC. However, the various portions of each coil may be implemented on different metal layers. In one embodiment, successive windings of the coil are implemented on descending metal layers beginning from a top metal layer of the IC. The coils are substantially equal in size and the number of windings, and are arranged concentrically with one another. However, embodiments are also possible and contemplated in which the coils are of a different size with respect to one another, and have a different number of windings. The two coils are electrically connected to each other at a center tap, which corresponds to the junction between the two inductors shown in FIGS. 2-4 as discussed above.

Communication System

Figure 6:
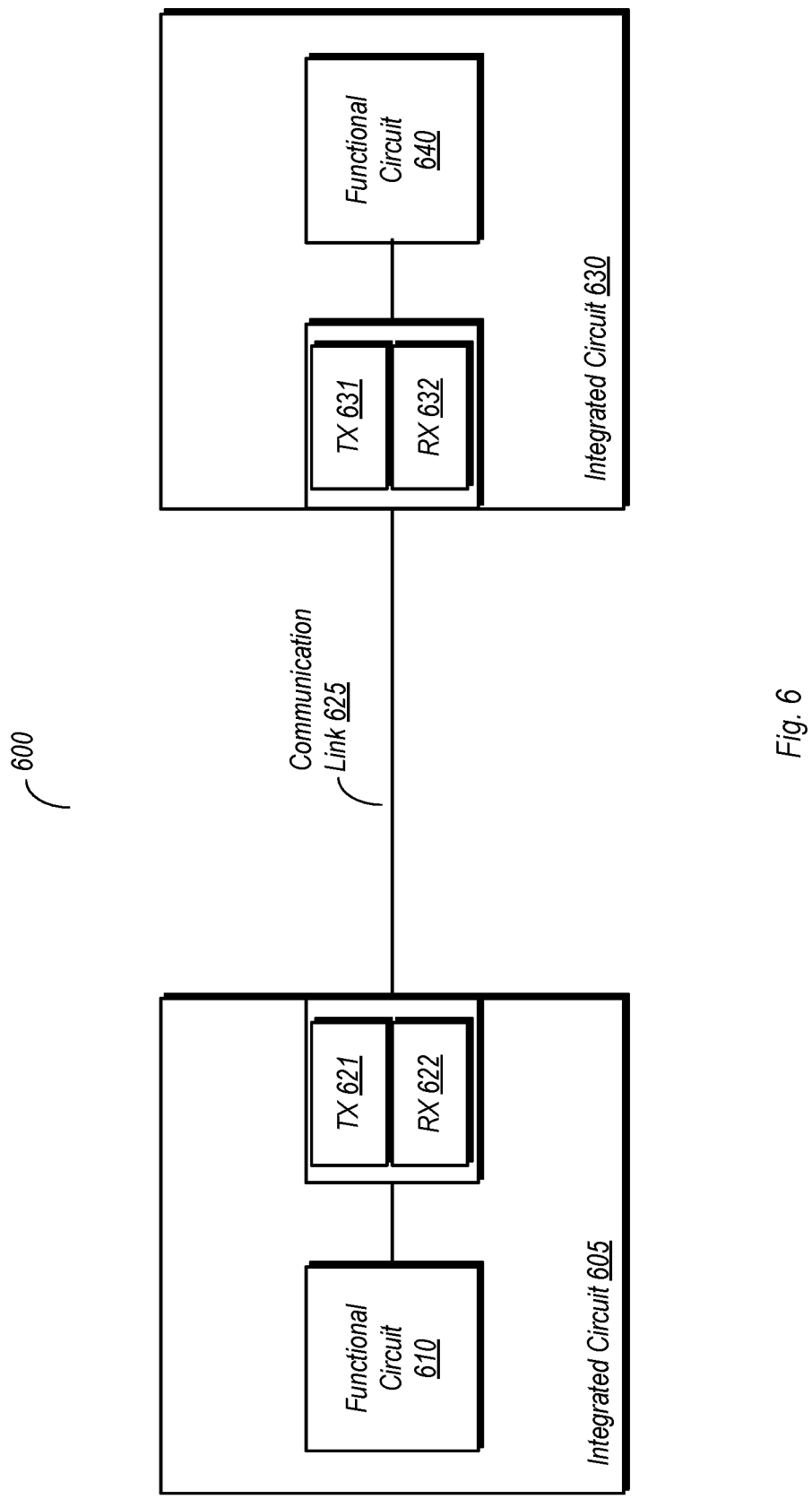
FIG. 6 is a diagram illustrating a communications link from a first IC to a second IC.

FIG. 6 is a block diagram illustrating two ICs connected to one another by a communications link of a communications subsystem. In the embodiment shown, IC 605 includes a functional circuit 610 and a transceiver that includes transmitter 621 and receiver 622. IC 630 includes a functional circuit block and a transceiver that includes transmitter 631 and receiver 632. Receivers 622 and 632 in the embodiment shown may be any of the embodiments discussed above, and may operate in accordance with various embodiments of the methods to be discussed below. The two transceivers are coupled to one another by a serial communications link 625.

The presences of the communications subsystem may allow for the exchange of information between functional circuit 610 of IC 605 and functional circuit 640 of IC 630. Information may be sent from one of these functional units in parallel to a correspondingly coupled transmitter, where the information is serialized and encoded. The information may then be transmitted across communications link 625, where it is received, decoded, and converted back into parallel by a receiver 632, and subsequently transmitted to its corresponding functional circuit.

IC 605 and IC 630 may each be one of a number of different IC types. For example, IC 605 may be an SoC in a computing system, while IC 630 may be a processor implemented in a peripheral device. Similarly, the functional units in each of the ICs shown here may be processor cores, graphics processor, I/O circuits, or virtually any other type of functional circuit implemented on an IC.

Methods for Operating a Receiver Circuit

Figure 7:
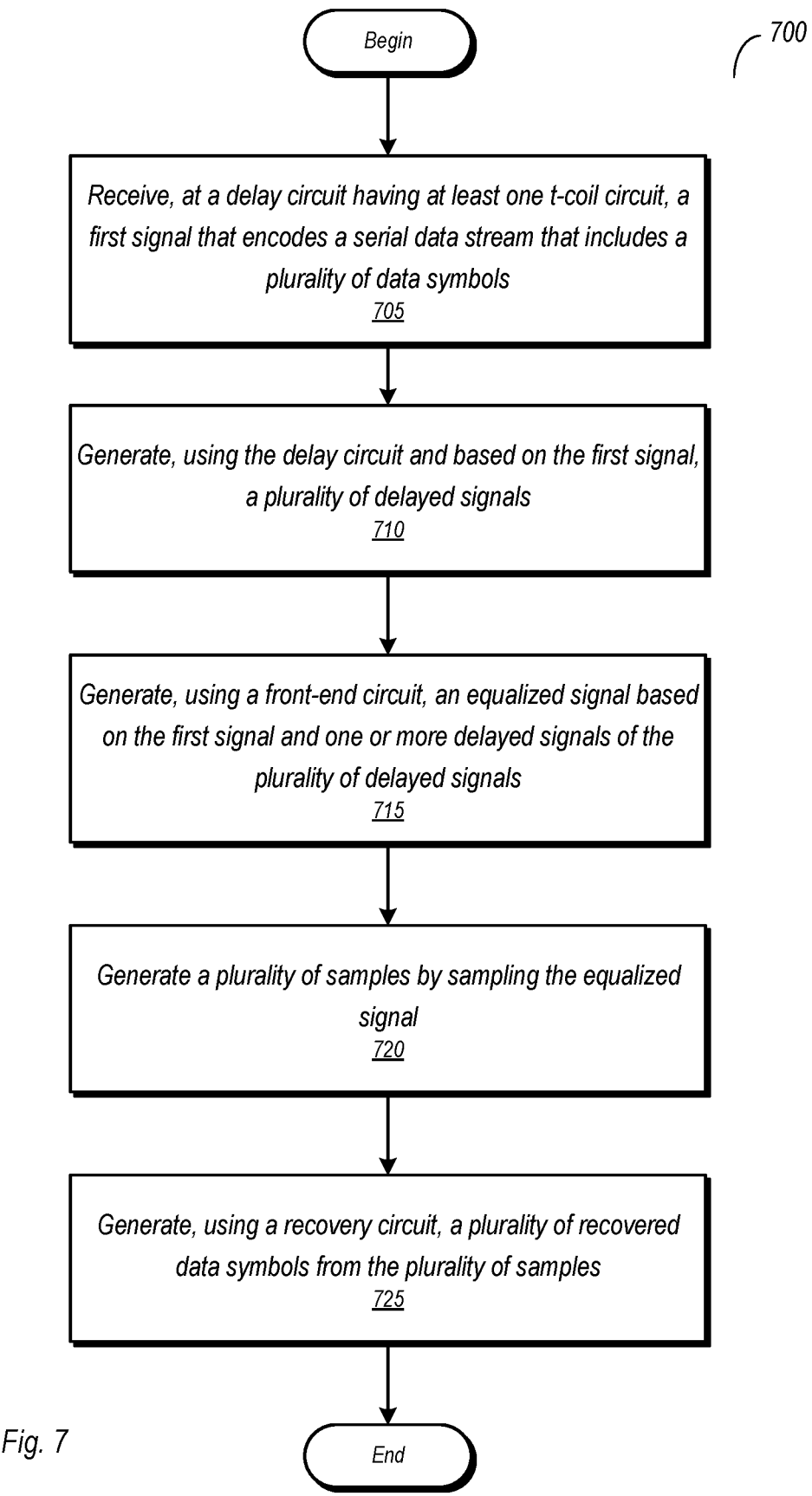
FIG. 7 is a flow diagram of one embodiment of a method for operating a receiver circuit.

FIG. 7 is a flow diagram of one embodiment of a method for operating a receiver circuit. Method 700 as shown in FIG. 7 may be carried out by various embodiments of the receiver circuit discussed above in reference to FIGS. 1-6. Embodiments of a receiver circuit not explicitly discussed herein but capable of carrying out Method 700 are also considered to fall within the scope of this disclosure.

Method 700 begins with receiving, at a delay circuit having at least one T-coil circuit, a first signal that encodes a serial data stream that includes a plurality of data symbols (block 705). The method further includes generating, using the delay circuit and based on the first signal, a plurality of delayed signals (block 710) and generating, using a front-end circuit, an equalized signal based on the first signal and one or more delayed signals of the plurality of delayed signals (block 715). Thereafter, the method includes generating a plurality of samples by sampling the equalized signal (block 720) and generating, using a recovery circuit, a plurality of recovered data symbols from the plurality of samples (block 725).

In various embodiments, generating the equalized signal comprises combining the first signal and the one or more delayed signals to generate a combined signal. The method further includes generating a filtered signal by filtering the combined signal, and thus generating the equalized signal by adjusting an amplitude of the filtered signal.

In various embodiments, the method includes adjusting, using respective ones of a plurality of transconductance circuits, respective magnitudes of the first signal and the one or more delayed signals. Embodiments of the method may include a first inductor coil of the at least one T-coil circuit delaying the first signal to generate a first delayed signal and a second inductor coil of the at least one T-coil circuit delaying the first delayed signal to generate a second delay signal.

Some embodiments of the method includes generating ones of the plurality of delayed signals using a plurality of serially-coupled T-coil circuits, including the at least one T-coil circuit. Furthermore, various embodiments of the method includes providing the first signal directly to the front-end circuit without delay (e.g., the delay provided by any of the plurality of serially-coupled T-coils).

Figure 8:
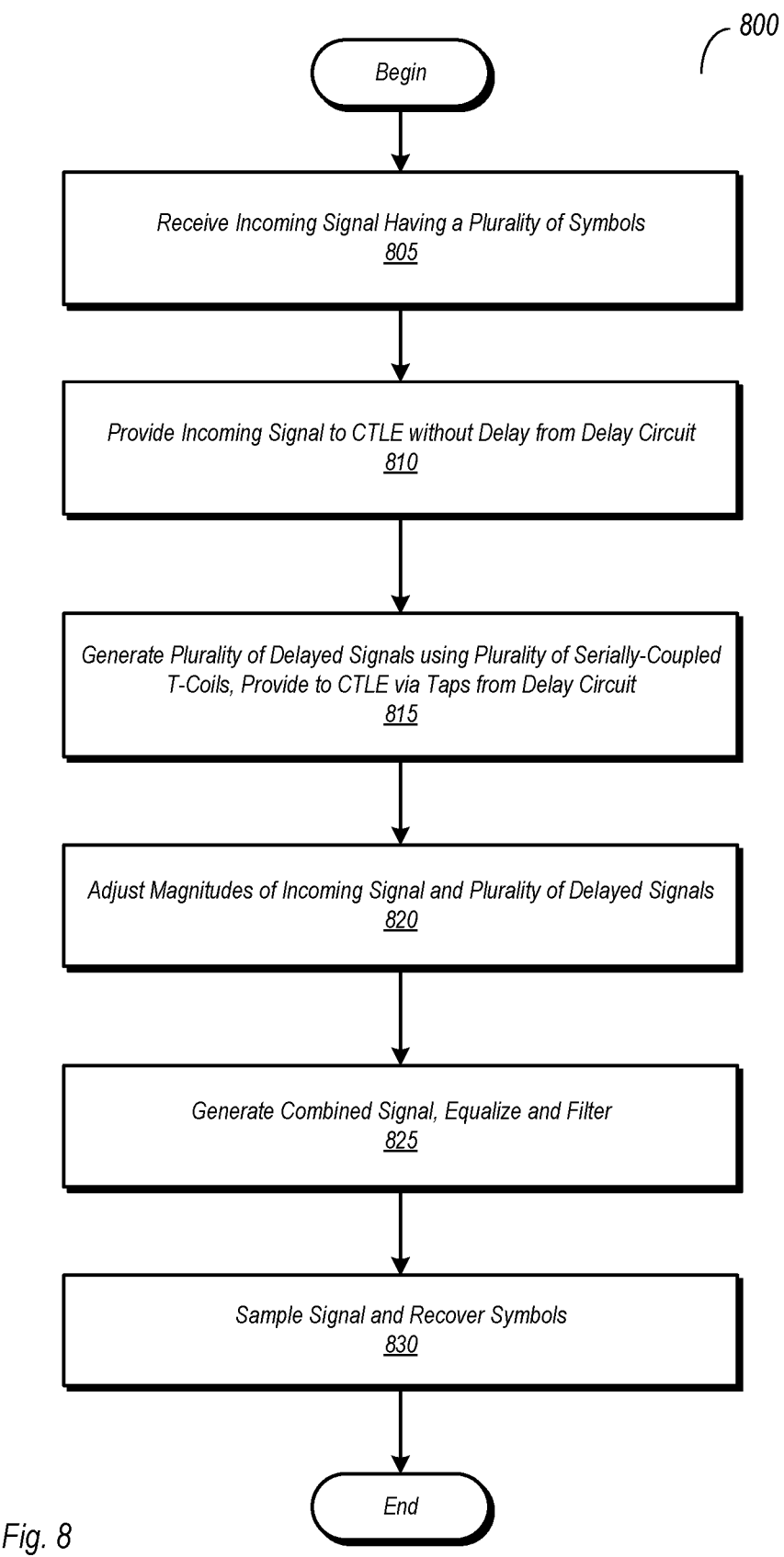
FIG. 8 is a flow diagram of another embodiment of a method for operating a receiver circuit.

FIG. 8 is a flow diagram of another embodiment of a method for operating a receiver circuit. Method 800 may be carried out by various embodiments of the receiver circuit discussed above in reference to FIGS. 1-6. Embodiments of a receiver circuit not explicitly discussed herein but otherwise capable of carrying out Method 800 also fall within the scope of this disclosure.

Method 800 includes receiving an incoming signal having a plurality of symbols therein (block 805). The plurality of symbols may be encoded in the incoming signal according to various encoding schemes, such as PAM3, PAM4, NRZ, and so on. The method further includes providing the incoming signal to a CTLE circuit without any delay provided thereto by the delay circuit (block 810). While there may be some intrinsic delay (e.g., due to an ESD circuit) between the input node upon which the incoming signal is received and a corresponding CTLE input, this delay may be negligible relative to the delay provided by the delay circuit, and thus the incoming signal may be considered to have been directly provided to the corresponding CTLE input.

The method further includes generating a plurality of delayed signals using the plurality of serially-coupled T-coils and providing them, via taps, from the delay circuit to the CTLE (block 815). Thereafter, respective magnitudes of the delayed signals, along with that of the incoming signal, may be adjusted (block 820) by transconductance circuits in the CTLE. With the outputs of the transconductance circuits coupled to one another, the magnitude adjusted delay circuits are combined on a summing node, equalized, and filtered in the CTLE (block 825). Thereafter, the filtered signal may be forwarded to a sampling circuits, sampled, and the symbols within the signal recovered (block 830) by, e.g., a CDR circuit.

Example System

Figure 9:
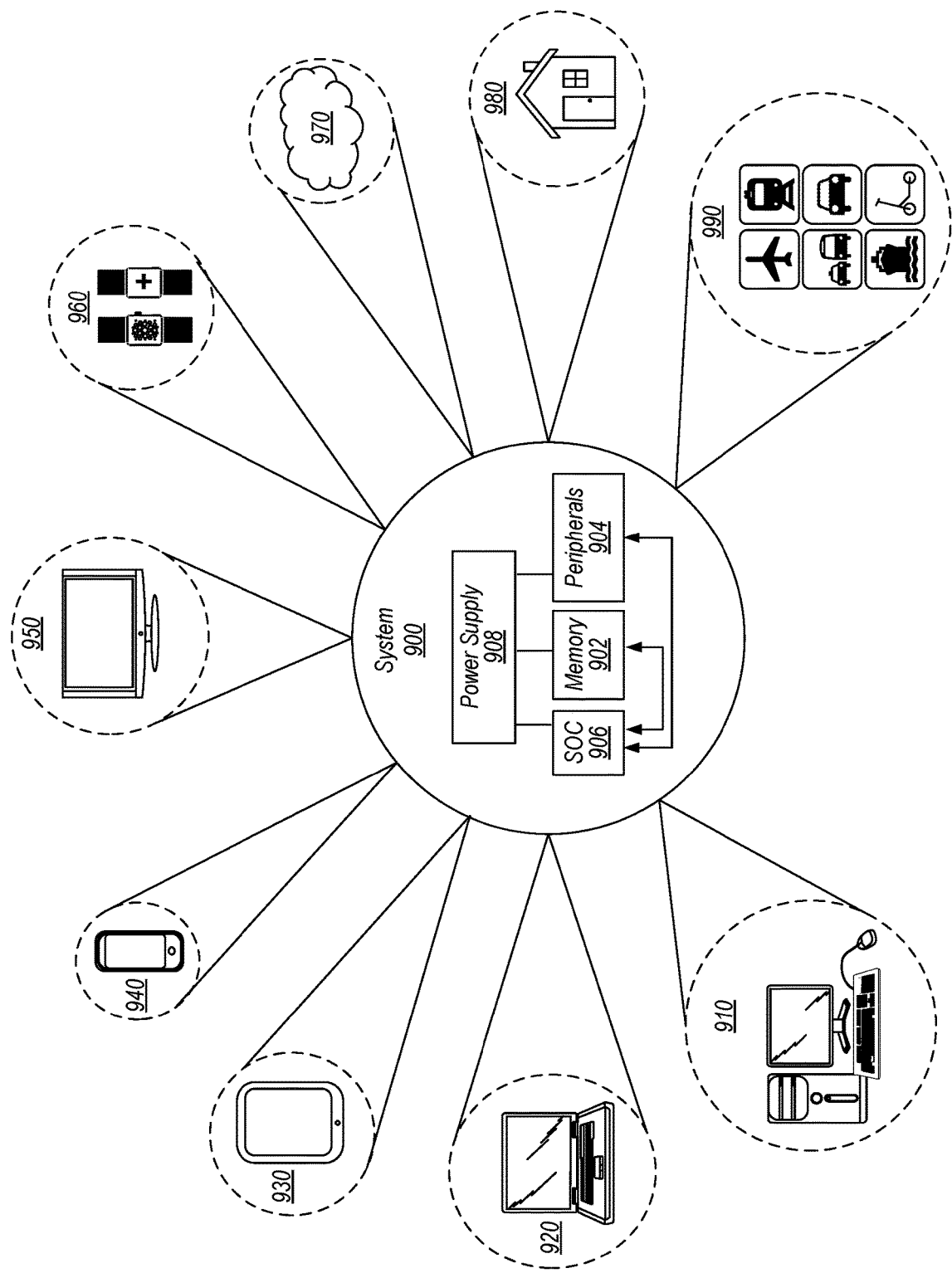
FIG. 9 is a block diagram of an example system.

Turning next to FIG. 9, a block diagram of one embodiment of a system 900 is shown that may incorporate and/or otherwise utilize the methods and mechanisms described herein. In the illustrated embodiment, the system 900 includes at least one instance of a system on chip (SoC) 906 which may include multiple types of processing units, such as a central processing unit (CPU), a graphics processing unit (GPU), or otherwise, a communication fabric, and interfaces to memories and input/output devices. In some embodiments, one or more processors in SoC 906 includes multiple execution lanes and an instruction issue queue. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

ICs in various ones of the components of system 900 may include serial-link communications systems or portions thereof, and may thus include one or more instances of a receiver circuit discussed above. For example, one or more serial-link communications systems implementing receivers in accordance with the discussion above may be implemented between SoC 906 and one or more ICs implemented in peripherals 904. Embodiments are also possible and contemplated in which a serial-link communications system having a receiver as disclosed herein may be wholly implemented on a single IC.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, smartwatch 960 may include a variety of general-purpose computing related functions. For example, smartwatch 960 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise. These any many other embodiments are possible and are contemplated. It is noted that the devices and applications illustrated in FIG. 9 are illustrative only and are not intended to be limiting. Other devices are possible and are contemplated.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use nonplanar devices such as FinFETs, GAAFETs (Gate All Around FETs), among other types. Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a delay circuit configured to receive a first signal that encodes a serial data stream that includes a plurality of data symbols, wherein the delay circuit includes a T-coil circuit and is configured to generate, based on the first signal, a first delayed signal at a center-tap junction of the T-coil circuit and a second delayed signal at an output junction of the T-coil circuit;
   a front-end circuit, wherein the front-end circuit is an analog circuit comprising a continuous time linear equalizer (CTLE) and is configured to:
      receive the first signal, the first delayed signal, and the second delayed signal, wherein the first signal is received without a delay being applied; and
      generate an equalized signal using the first signal, the first delayed signal, and the second delayed signal, and wherein, to generate the equalized signal, the front-end circuit is configured to generate one or more cancellation signals to cancel a precursor present in the first signal and further configured to cancel a postcursor present in the first signal;
   a sample circuit configured to sample the equalized signal to generate a plurality of samples; and
   a recovery circuit configured to generate a plurality of recovered data symbols using the plurality of samples.

2. The apparatus of claim 1, wherein the front-end circuit is further configured to adjust respective magnitudes of the first signal, the first delayed signal, and the second delayed signal, and wherein to generate the equalized signal, the front-end circuit is configured to:
   combine the first signal, the first delayed signal, and the second delayed signal to generate a combined signal;
   filter the combined signal to generate a filtered signal; and
   adjust an amplitude of the filtered signal to generate the equalized signal.

3. The apparatus of claim 1, wherein the T-coil circuit includes a first coil and a second coil arranged concentrically and coupled to one another at a center tap, wherein the first coil is configured to delay the first signal to generate the first delayed signal, and wherein the second coil is configured to delay the first delayed signal to generate the second delayed signal.

4. The apparatus of claim 1, wherein:
the delay circuit includes a plurality of T-coil circuits, including the T-coil circuit, coupled in series;
ones of the plurality of T-coil circuits are configured to provide corresponding ones of a plurality of delayed signals to corresponding inputs of the front-end circuit, the plurality of delayed signals including the first delayed signal and the second delayed signal; and
the front-end circuit is coupled to receive the first signal directly without delay provided by the delay circuit.

5. The apparatus of claim 1, wherein the T-coil circuit includes:
a first inductor;
a second inductor coupled to the first inductor at a first node;
a first diode having an anode coupled to the first node and a cathode coupled to a supply voltage node; and
a second diode having an anode coupled to a ground node and a cathode coupled to the first node.

6. The apparatus of claim 1, wherein the front-end circuit includes a plurality of transconductance circuits, wherein a first one of the plurality of transconductance circuits is coupled to receive the first signal and wherein remaining ones of the plurality of transconductance circuits include respective inputs coupled to receive one of the first delayed signal and the second delayed signal.

7. The apparatus of claim 6, wherein ones of the plurality of transconductance circuits have a different transconductance with respect to other ones of the plurality of transconductance circuits.

8. The apparatus of claim 1, wherein the first signal is a differential signal having a true signal path and a complementary signal path.

9. The apparatus of claim 1, wherein:
the delay circuit includes a plurality of T coil circuits configured to generate a plurality of delayed signals that includes the first delayed signal and the second delayed signal;
the front-end circuit is configured to generate the equalized signal using the first signal and the plurality of delayed signals generated by the plurality of T coil circuits; and
the one or more cancellation signals are generated based on the undelayed first signal and on the plurality of delayed signals.

10. The apparatus of claim 1, wherein the recovery circuit is further configured to provide one or more recovered data symbols of the plurality of recovered data symbols to the sample circuit, and wherein the sample circuit is further configured to adjust sampling voltage levels based on the one or more recovered data symbols.

11. A method comprising:
receiving, at a delay circuit having a T-coil circuit, a first signal that encodes a serial data stream that includes a plurality of data symbols;
generating, using the delay circuit and based on the first signal, a first delayed signal generated at a center-tap junction of the T-coil circuit and a second delayed signal generated at an output junction of the T-coil circuit;
receiving, using an analog front-end circuit comprising a continuous time linear equalizer (CTLE), the first signal, the first delayed signal, and the second delayed signal, wherein the first signal is received without a delay being applied; and
generating, using the analog front-end circuit, an equalized signal based on the first signal, wherein, generating the equalized signal includes applying the first signal to the front-end circuit without applying a delay, and wherein generating the equalization signal includes generating one or more cancellation signals to cancel a precursor present in the first signal and further configured to cancel a postcursor present in the first signal;
generating a plurality of samples by sampling the equalized signal; and
generating, using a recovery circuit, a plurality of recovered data symbols from the plurality of samples.

12. The method of claim 11, wherein generating the equalized signal comprises:
combining the first signal, the first delayed signal, and the second delayed signal to generate a combined signal;
generating a filtered signal by filtering the combined signal; and
generating the equalized signal by adjusting an amplitude of the filtered signal.

13. The method of claim 11, further comprising:
adjusting, using respective ones of a plurality of transconductance circuits, respective magnitudes of the first signal, the first delayed signal, and the second delayed signal.

14. The method of claim 11, further comprising:
a first inductor coil of the T-coil circuit delaying the first signal to generate the first delayed signal; and
a second inductor coil of the T-coil circuit delaying the first delayed signal to generate the second delayed signal.

15. The method of claim 11, further comprising generating a plurality of delayed signals using a plurality of serially-coupled T-coil circuits including the T-coil circuit, the plurality of delayed signals including the first delayed signal and the second delayed signal.

16. The method of claim 11, further comprising providing the first signal directly to the front-end circuit without delay.

17. A circuit comprising:
a plurality of serially-coupled T-coil circuits including a first T-coil circuit, wherein the first T-coil circuit is coupled to receive an incoming signal having a plurality of symbols, and wherein ones of the plurality of serially-coupled T-coil circuits are configured to generate respective ones of a plurality of delayed signals using the incoming signal;
a front-end circuit, wherein the front-end circuit is an analog circuit comprising a continuous time linear equalizer (CTLE) and is coupled to a plurality of taps of the plurality of serially-coupled T-coil circuits, wherein the front-end circuit is configured to generate an equalized signal using the incoming signal and ones of the plurality of delayed signals, wherein the incoming signal is provided to the front-end circuit without applying a delay, and wherein, to generate the equalized signal, the front-end circuit is configured to generate one or more cancellation signals to cancel a precursor present in the incoming signal and further configured to cancel a postcursor present in the incoming signal;
a sample circuit configured to a generate a plurality of samples using the equalized signal; and a recovery circuit configured to generate a plurality of recovered data symbols based on the plurality of samples.

18. The circuit of claim 17, wherein the front-end circuit includes a plurality of transconductance amplifiers configured to adjust an amplitude of correspondingly received ones of the incoming signal and the plurality of delayed signals.

19. The circuit of claim 18, wherein outputs of the plurality of transconductance amplifiers are coupled to one another to generate a combined signal using amplified versions of the incoming signal and the plurality of delayed signals, and wherein the circuit further comprises a filter configured to generate a filtered signal using the combined signal.

20. The circuit of claim 18, wherein ones of the plurality of transconductance amplifiers have a transconductance that is different than other ones of the transconductance amplifiers.

* * * * *